United States Patent [19]
Yasui

[11] Patent Number: 5,583,783
[45] Date of Patent: Dec. 10, 1996

[54] CHECKWRITER AND METHOD

[75] Inventor: Tsuneo Yasui, Nagoya, Japan

[73] Assignee: Brother Kogyo Kabushiki Kaisha, Nagoya, Japan

[21] Appl. No.: 428,676

[22] Filed: Apr. 25, 1995

[30] Foreign Application Priority Data

May 20, 1994 [JP] Japan .................................. 6-131290

[51] Int. Cl.⁶ .......................... G06F 17/60; G06F 19/00
[52] U.S. Cl. .................... 364/478.01; 364/705.02; 395/233; 395/768
[58] Field of Search ................................ 364/478, 406, 364/408, 705.02, 708.1, 709.04, 710.04, 710.13; 235/379, 3, 58 CW; 400/78, 83, 88; 283/58; 395/111

[56] References Cited

U.S. PATENT DOCUMENTS

| | | | |
|---|---|---|---|
| 3,920,979 | 11/1975 | Kilby et al. | 364/705.02 |
| 4,455,100 | 6/1984 | Bauer et al. | 364/710.13 X |
| 4,623,965 | 11/1986 | Wing | 364/705.02 X |
| 4,635,219 | 1/1987 | Howard | 364/710.13 |
| 5,233,547 | 8/1993 | Kapp et al. | 364/705.02 |
| 5,299,295 | 3/1994 | Kim et al. | 395/111 |
| 5,475,403 | 12/1995 | Havlovick et al. | 364/408 X |

FOREIGN PATENT DOCUMENTS 62-234959 10/1987 Japan .

*Primary Examiner*—Joseph Ruggiero
*Attorney, Agent, or Firm*—Oliff & Berridge

[57] ABSTRACT

A checkwriter has a tray for containing check forms having a transparent cover with a scaled region provided with scale lines. The tray is detachably loaded into the check printing unit thereof. When the cover is closed, the surface of the top check form among check forms stacked in the tray can be observed through the transparent cover, and print starting positions where the printing operation for printing desired words for items is started can be measured using the scale lines. The measured print starting positions are registered to correctly print the desired words for the items at predetermined positions on the check form. Since the cover is combined with the tray, it is prevented from being lost.

20 Claims, 10 Drawing Sheets

Fig.6B

| ITEM | INSTRUCTIONS |
|---|---|
| S1 | HAS THE LOCATION KEY BEEN DEPRESSED ? |
| S2 | DISPLAY "BANK A" |
| S3 | SPECIFY A BANK |
| S4 | HAS ENTER KEY BEEN DEPRESSED ? |
| S5 | DISPLAY DATE PRINT POSITION SPECIFYING MENU |
| S6 | PRINT POSITION DETERMINING PROCEDURE |
| S7 | DISPLAY PAYEE PRINT POSITION SPECIFYING MENU |
| S8 | PRINT POSITION DETERMINING PROCEDURE |
| S9 | DISPLAY AMOUNT-IN-NUMBERS PRINT POSITION SPECIFYING MENU |
| S10 | PRINT POSITION DETERMINING PROCEDURE |
| S11 | DISPLAY AMOUNT-IN-WORDS PRINT POSITION SPECIFYING MENU |
| S12 | PRINT POSITION DETERMINING PROCEDURE |
| S13 | DISPLAY MEMO PRINT POSITION SPECIFYING MENU |
| S14 | PRINT POSITION DETERMINING PROCEDURE |

Fig.8A
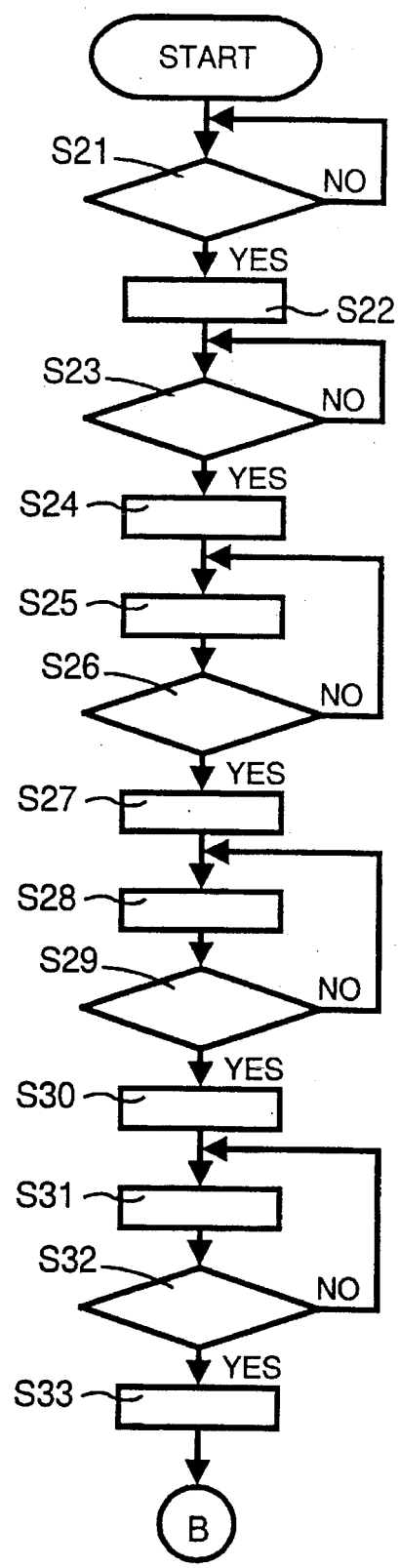
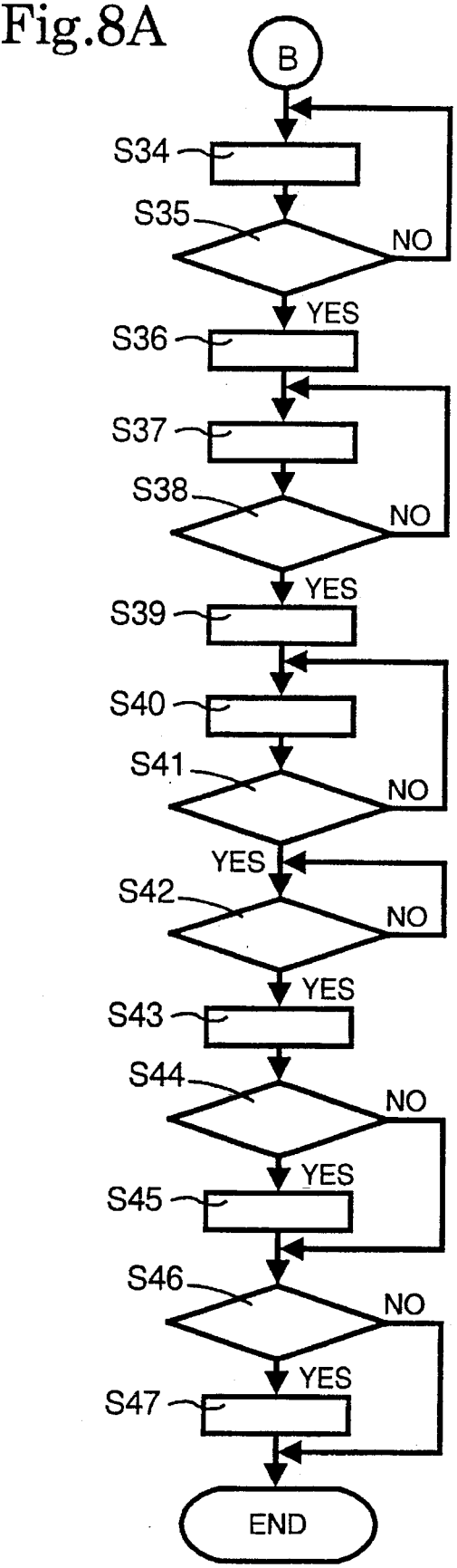

Fig.8B

| ITEM | INSTRUCTIONS |
|---|---|
| S21 | HAS THE TRAY BEEN LOADED INTO THE CHECK PRINTING UNIT ? |
| S22 | TYPE CHECK NUMBER |
| S23 | HAS THE CHECK KEY BEEN DEPRESSED ? |
| S24 | DISPLAY "PAYMENT?, DEPOSIT?" |
| S25 | SELECT DESIRED TASK |
| S26 | HAS THE ENTER KEY BEEN DEPRESSED ? |
| S27 | DISPLAY "CHECK NUMBER?" |
| S28 | TYPE A CHECK NUMBER |
| S29 | HAS THE ENTER KEY BEEN DEPRESSED ? |
| S30 | DISPLAY "DATE?" |
| S31 | TYPE A CHECK ISSUE DATE |
| S32 | HAS THE ENTER KEY BEEN DEPRESSED ? |
| S33 | DISPLAY "PAY TO?" |
| S34 | TYPE A PAYEE |
| S35 | HAS THE ENTER KEY BEEN DEPRESSED ? |
| S36 | DISPLAY "$?" |
| S37 | TYPE AN AMOUNT OF PAYMENT |
| S38 | HAS THE ENTER KEY BEEN DEPRESSED ? |
| S39 | DISPLAY "MEMO?" |
| S40 | TYPE WORDS FOR MEMO |
| S41 | HAS THE ENTER KEY BEEN DEPRESSED ? |
| S42 | HAS THE ENTER KEY BEEN DEPRESSED ? |
| S43 | DISPLAY "PRINT?" |
| S44 | DEPRESS THE "Y" KEY OR THE "N" KEY |
| S45 | EXECUTE PRINTING OPERATION |
| S46 | HAS THE BALANCE COLLATING KEY BEEN DEPRESSED ? |
| S47 | DISPLAY THE BALANCE |

CHECKWRITER AND METHOD

BACKGROUND OF THE INVENTION

1. Field of the Invention

The present invention relates to a portable checkwriter and, more particularly, to techniques for printing characters and digits at predetermined positions on a check form.

2. Description of the Related Art

Checkwriters that print characters and digits at predetermined positions on a check form when check issue date, amount, name of payee, etc. are specified are disclosed in, for example, U.S. Pat. No. 3,920,979 and Japanese Laid-Open Appln. No. 62-234959.

However, since check forms of different banks have different positions where characters and digits are to be printed, characters and digits may be mislocated from correct positions on some check forms, spoiling the appearance of the check. A known checkwriter uses a separate template to avoid the mislocation of printed characters and digits. When printing necessary entries on a check form with this known checkwriter, the positions of blanks to be filled in are measured with the template to determine print starting positions accurately, data representing the print starting positions are given to the checkwriter, and the checkwriter is operated to print the entries. Since the template is separate from the checkwriter, however, the template may be lost.

SUMMARY OF THE INVENTION

An object of the present invention is to provide a checkwriter capable of printing characters and digits at predetermined positions on a check form without using a separate template. The checkwriter is detachably provided with a tray for containing check forms, having a transparent cover provided with scale lines for determining print starting positions on a check form.

In order to achieve the above and other objects, the present invention provides a checkwriter for printing desired words for items including check issue data and amount in characters and digits at predetermined positions on a check form, including a tray for containing check forms, an input component for entering the desired words for the items to be printed on the check form and data representing print starting positions where the printing operation for printing the words for the items is to be started, a storage component for storing the data representing the words for the items and the data representing the print starting positions, a display for displaying the contents of the storage component, and a printing device for printing the words for the items on the check form being conveyed by the check form conveying device starting from the print starting positions. The tray has a transparent cover provided with scale lines for measuring the print starting positions for the items.

If the print starting position represented by the data entered by operating the input component is outside a region on the check form corresponding to the scaled region provided with the scale lines on the cover, the data of a position in the scaled region and nearest to the position represented by the data entered by operating the input component is stored as the data representing the print starting position in the storage component.

In the checkwriter thus constructed in accordance with the present invention, the tray containing the check forms has the transparent cover having the scaled region provided with the scale lines. Therefore, the surface of the check form can be observed through the transparent cover, and the print starting positions can be measured by comparing the check form with the scale lines. When the words for the desired items to be printed on the check form and the data representing the print starting positions are entered by operating the input component, the words and the data representing the print starting positions are stored in the storage component and are displayed on the display. When the checkwriter is operated for printing after loading the tray containing the check forms into the check printing unit of the checkwriter, the check form is conveyed by the check form conveying device to a printing position, and the printing device starts printing the words for each desired item from the correct print starting position for the item.

Even if the print starting position represented by the data entered by operating the input component is outside the region on the check form corresponding to the scaled region of the cover of the tray, the data of a position in the scaled region and nearest to the print starting position represented by the data entered by operating the input component is stored in the storage component. Therefore, the printing operation for printing the words for the desired item can be started from a proper position very close to a correct print starting position even if data correctly representing the print starting position is not entered.

As is understood from the foregoing description, since the checkwriter in accordance with the present invention includes the tray containing check forms, having the transparent cover having the scaled region provided with scale lines and capable of being detachably loaded into the printing unit, the surface of the check form can be observed through the transparent cover, the data representing the print starting positions for the items can be measured by comparing the check form with the scale lines of the transparent cover, and the words for the items can be printed at correct positions on the check form by registering the data representing the print starting positions. By this arrangement, the cover of the tray containing check forms having the scaled region provided with the scale lines is prevented from being lost.

BRIEF DESCRIPTION OF THE DRAWINGS

A preferred embodiment of the present invention will be described in detail with reference to the accompanying drawings, wherein:

FIGS. 6A and 6B are a flow chart of a print starting position registering procedure to be carried out by the checkwriter of FIG. 1;

FIGS. 8A and 8B are a flow chart of a printing procedure to be carried out by the checkwriter of FIG. 1.

DETAILED DESCRIPTION OF PREFERRED EMBODIMENTS

Figure 1:
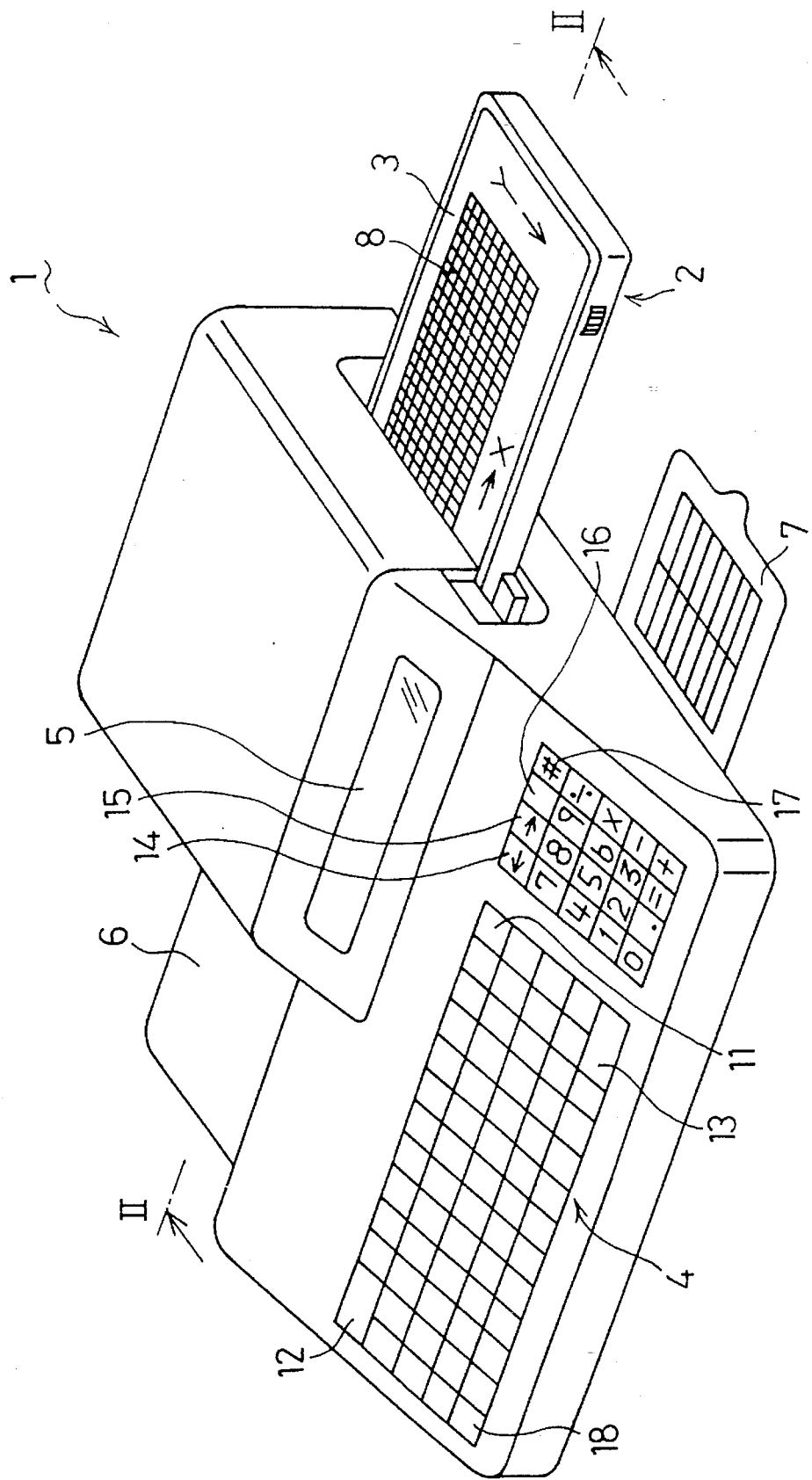
FIG. 1 is a perspective view of a checkwriter in a preferred embodiment according to the present invention.

Referring to FIG. 1, a checkwriter 1 embodying the present invention has a printing unit and a tray 2 containing check forms 21. The tray 2 is capable of being detachably loaded into the printing unit. The tray 2 has a transparent cover 3 having a scaled region provided with scale lines 8, which will be described later with reference to FIG. 3. The checkwriter 1 comprises a keyboard 4 provided with keys, i.e., input means, for entering print starting positions where the printing operation for printing desired words for necessary items is to be started, a liquid crystal display 5, i.e., display means, a check storing unit 6 for storing checks made by feeding check forms from the tray 2 and printing desired words for the items on the check forms, and a template 7 on which necessary matters are printed.

The keyboard 4 is provided with bank keys 11 for specifying a bank name, a collation key 12 for collating the balance with the ledger, an enter key 13 for entering selected matters, cursor keys 14 and 15, a check key for entering desired words to be printed on a check form, an abbreviated call key 17 (# key) for calling a registered payee, and location keys 18 for registering a print starting position for each item. Desired words for items including check issue date, amount to be printed on the check form 21 and print starting position for each item can be entered by operating the keys of the keyboard 4.

Figure 2:
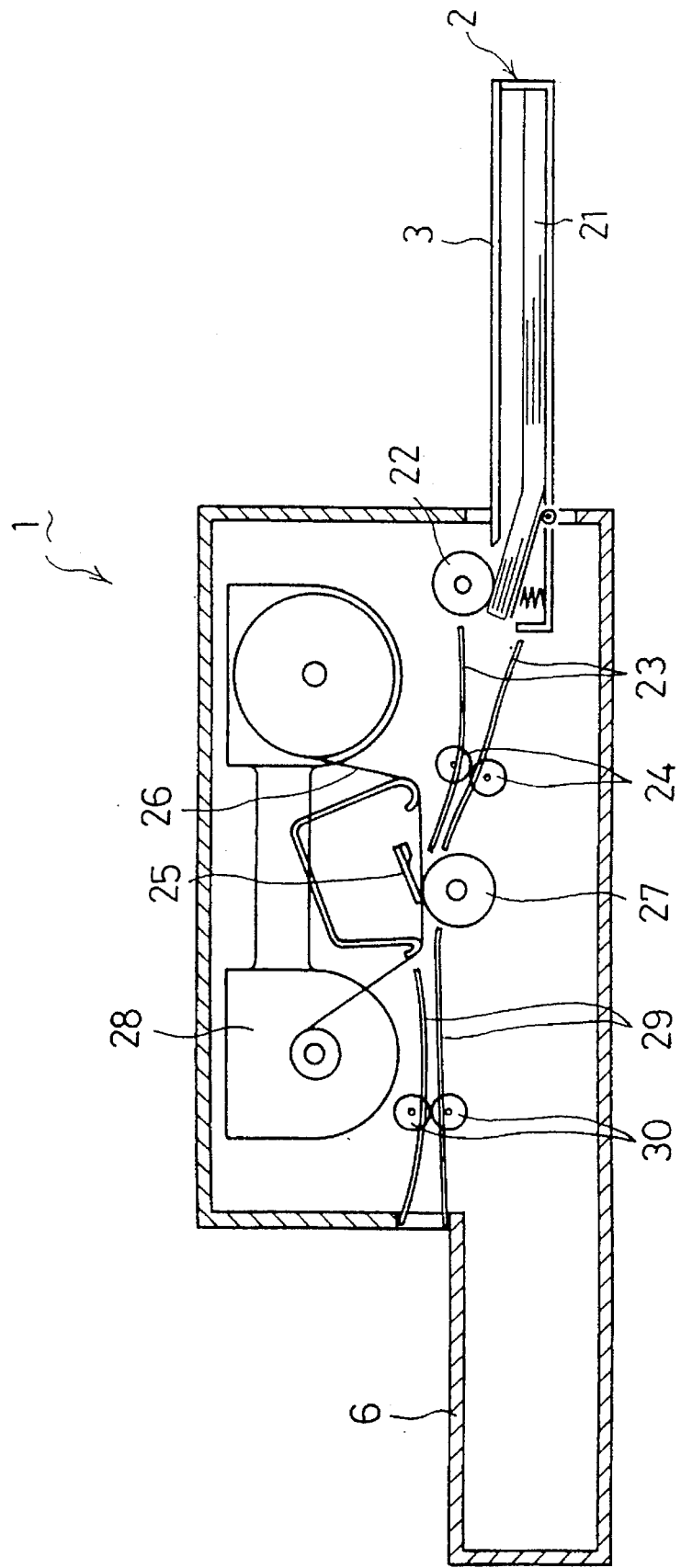
FIG. 2 is a sectional view taken on line II—II in FIG. 1.

Referring to FIG. 2 showing the checkwriter 1 in a sectional view taken on line II—II in FIG. 1, the checkwriter 1 is provided internally with a feed roller 22 for taking out the check forms 21 one at a time from the tray 2, guide frames 23 for guiding the check form 21, conveyor rollers 24 for conveying the check form 21, a print head 25 for printing words on the check form 21, a platen 27, a ribbon cassette 28 containing an ink ribbon 26, guide frames 29 for guiding the check form 21, and delivery rollers 30 for delivering the check form 21 into the check storing unit 6.

Figure 5:
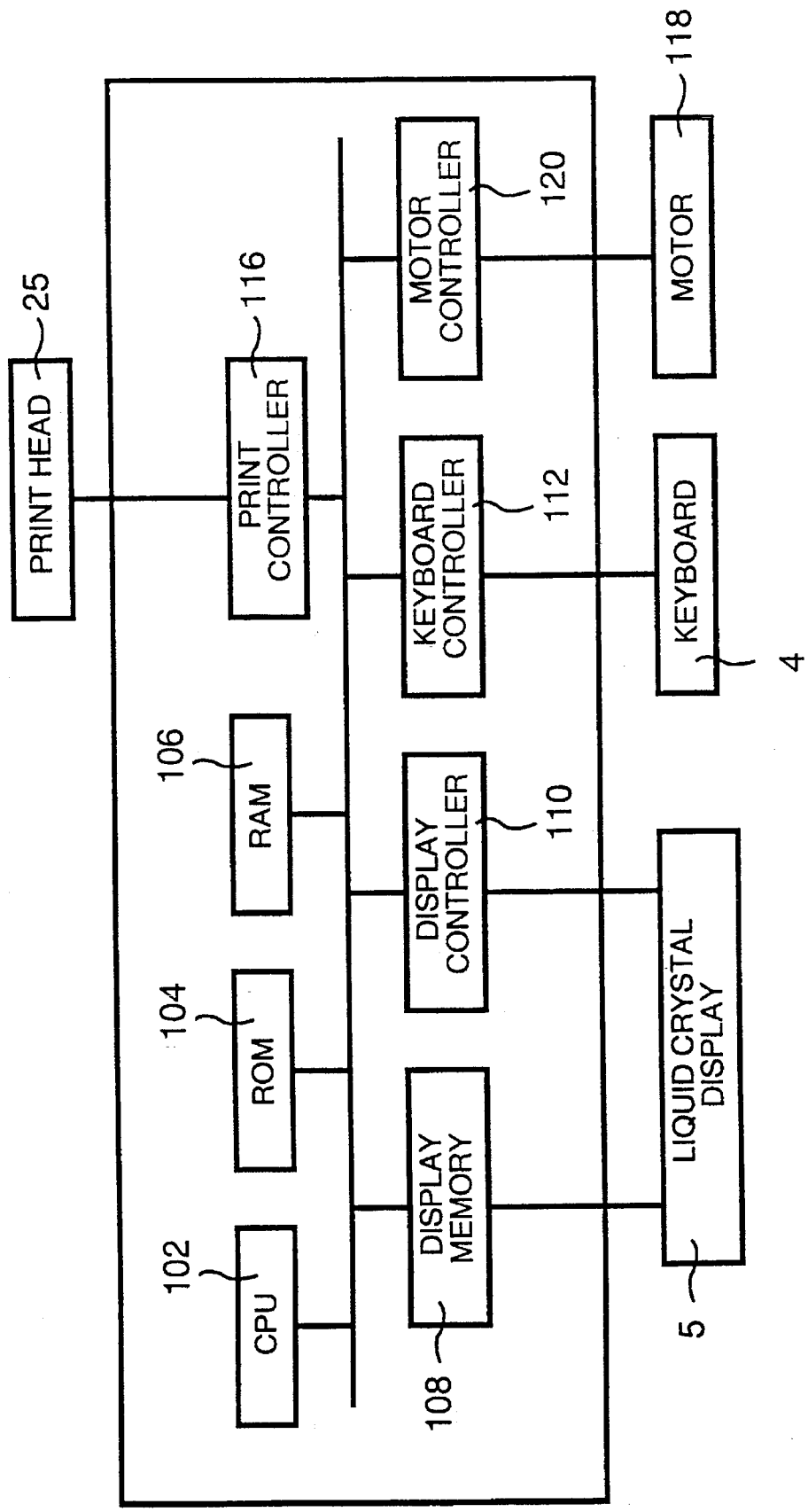
FIG. 5 is a block diagram of the electrical configuration of the checkwriter of FIG. 1.

As shown in FIG. 5, the checkwriter 1 has an electrical system comprising a CPU 102, i.e., arithmetic means, such as a microprocessor, a ROM 104 storing programs to be executed by the CPU 102, a RAM 106, i.e., a storage means, for storing data entered by operating the keys of the keyboard 4, an image data storage device 108 for storing image data representing images to be displayed on the liquid crystal display 5, a display controller 114 for controlling the liquid crystal display 5, a keyboard controller 112 for controlling the keyboard 4, a print controller 116 for controlling the print head 25, and a motor controller 120 for controlling a motor 118 for driving the feed roller 22, the conveyor rollers 24 and the delivery rollers 30 for rotation.

Figure 3:
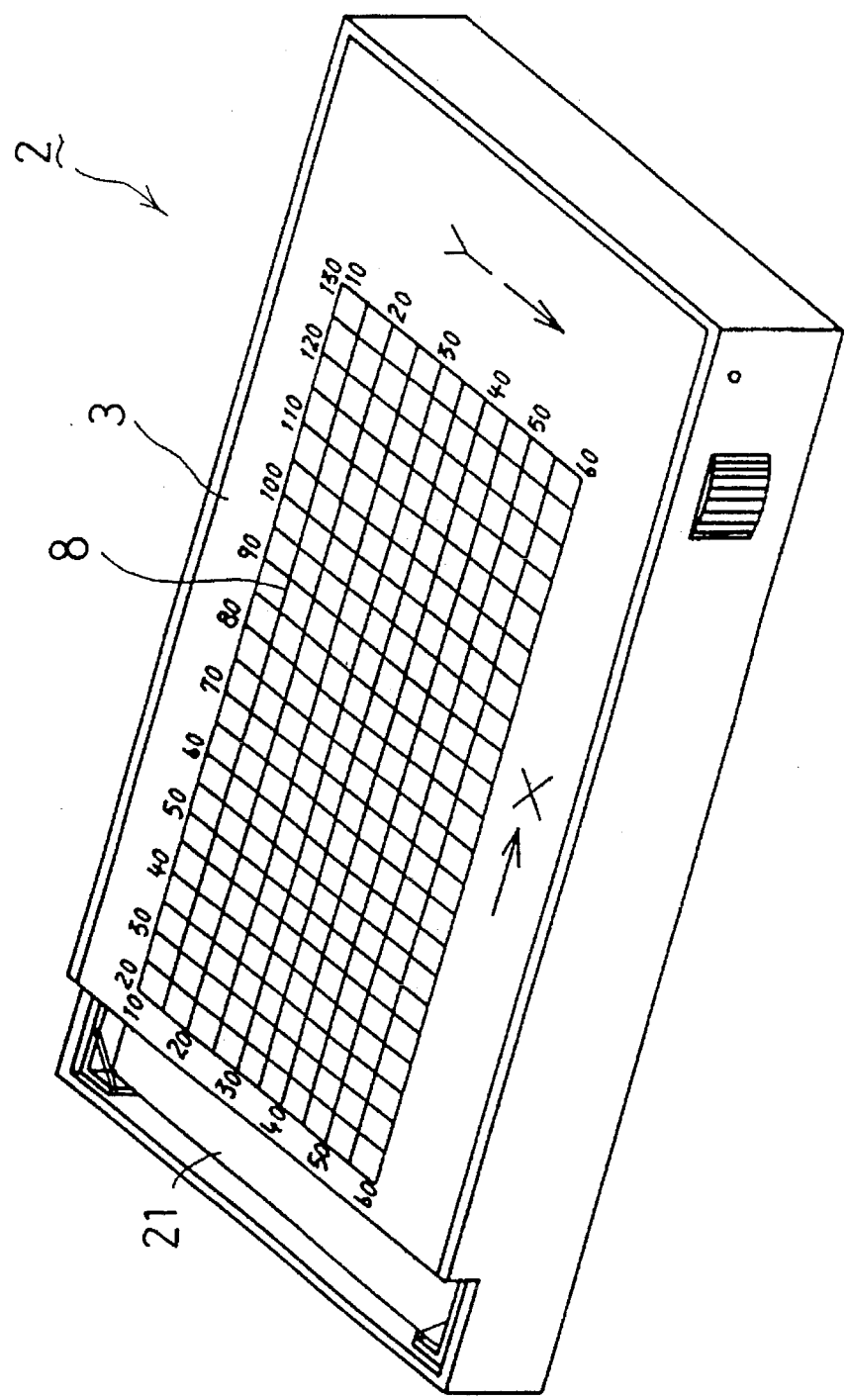
FIG. 3 is a perspective view of a tray included in the checkwriter of FIG. 1.

Referring to FIG. 3 showing the tray 2 of the checkwriter 1 in a perspective view, the transparent cover 3 of the tray 2 has the scaled region provided with the scale lines 8. The scale lines 8 are parallel lines arranged at intervals of, for example, 5 mm parallel to the X-axis and parallel lines arranged parallel to the Y-axis at intervals of, for example 5 mm. Graduations 20 mm to 130 mm are marked on the top line parallel to the X-axis and graduations 10 mm to 60 mm are marked on the leftmost line parallel to the Y-axis.

Figure 4:
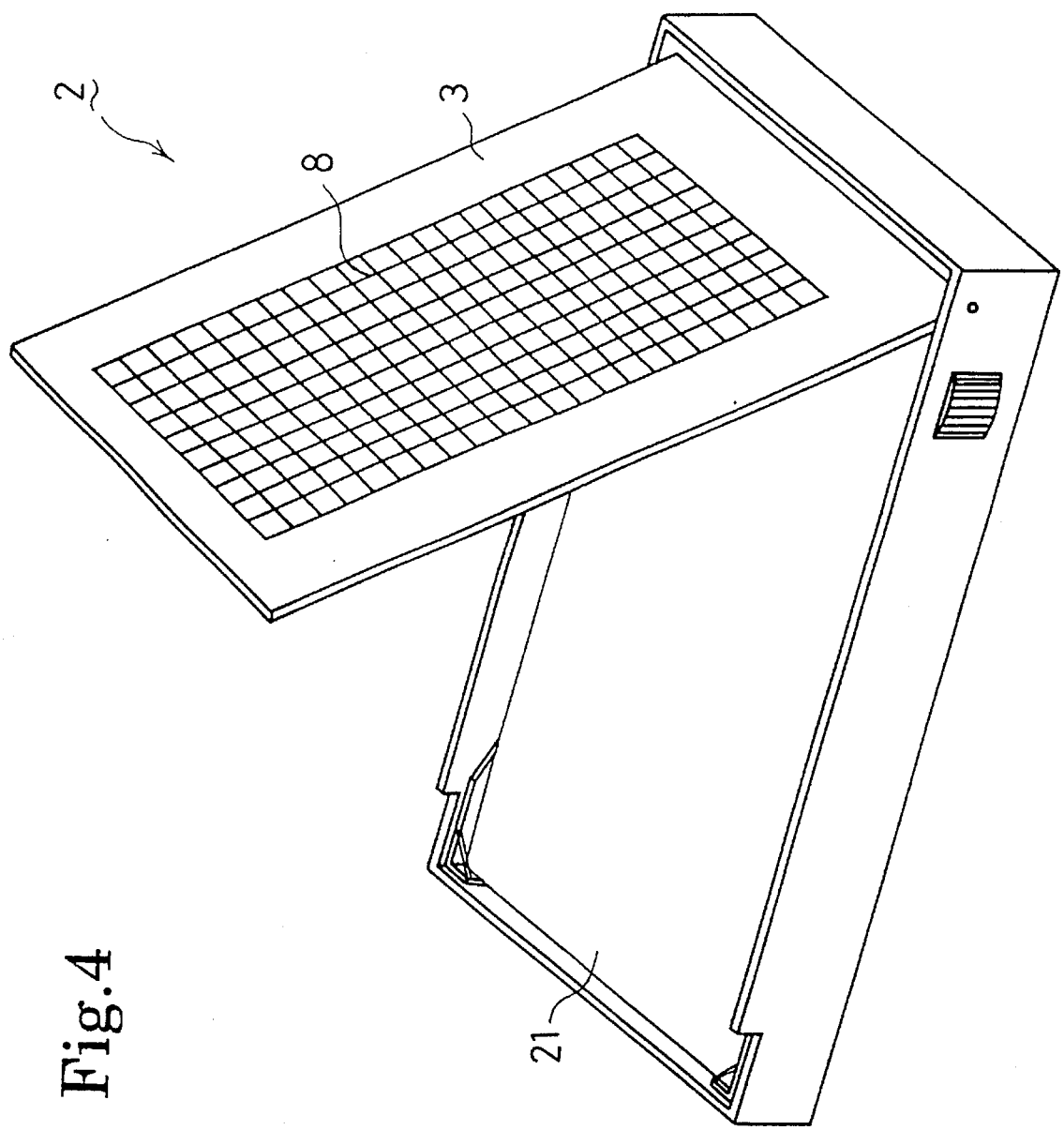
FIG. 4 is a perspective view of the tray of FIG. 3 with the cover open.

The cover 3 of the tray 2 is opened as shown in FIG. 4, the check forms 21 are placed in the tray 2, and the cover 3 is closed. The top check form 21 can be observed through the cover 3 from above the tray 2 to measure the print starting positions for items with reference to the scale lines 8. In contrast with the conventional apparatus, since the cover 3 having the scaled region provided with the scale lines 8 for measuring the print starting positions is combined with the tray 2, the cover 3 is prevented from being lost.

The preparatory operation of the checkwriter 1 will be described hereinafter. Suppose that three banks can be registered. When the bank key 11 is depressed, a message, "BANK A?" is displayed on the liquid crystal display 5. Then, the keyboard 4 is operated to specify, for example, a bank, "FIRST" and the enter key 13 is depressed; consequently, the bank, "FIRST" is registered as "BANK A." Then, a message, "$ ?" is displayed on the liquid crystal display 5. An amount, for example, "5,000" is specified, and the enter key 13 is depressed to register the amount. Then, a message, "BANK A: FIRST, $5,000" is displayed on the liquid crystal display 5. Then, banks are registered as BANK B and BANK C and amounts drawn on the banks BANK B and BANK C are registered by the same procedure.

Since different banks require slightly different positions where the words for the items are to be printed, the positions where printing the words for the items are to be started must be adjusted. When entering each print starting position, the check form 21 is observed through the cover 3 having the scaled region provided with the scale lines 8, and the abscissa and the ordinates of the print starting position are measured. Values less than 5 mm are measured at rough estimates because the pitches of the scale lines are 5 mm. Graduations at 1 mm enable accurate measurement of the print starting position; however, an arrangement of an excessively large numbers of scale lines at small intervals will make the measurement of the print starting position difficult, and hence, a desirable interval between the scale lines 8 is around 5 mm. The items to be printed on the check form 21 are check issue date, payee, amount in numbers, amount in words, and memo.

Figure 6A:
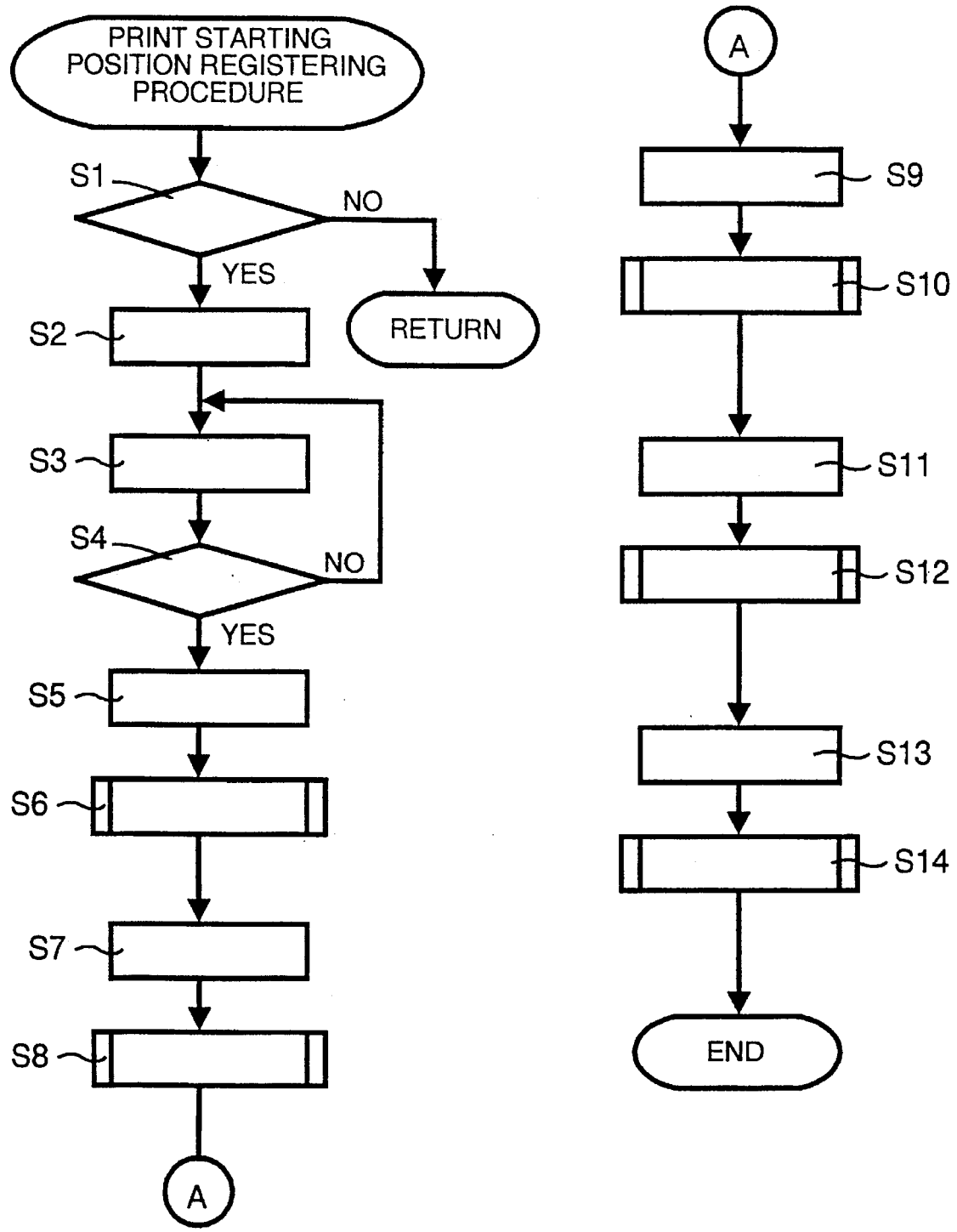

A print starting position registering procedure will be described with reference to the flow chart of FIGS. 6A and 6B. When the location key 18 is depressed (the response to a query in step S1 is affirmative), the name of the previously registered BANK A is displayed on the liquid crystal display 5 in step S2. Every time the cursor key 14 or 15 is depressed, the information displayed on the liquid crystal display 5 is scrolled to display the names of BANK A, BANK B and BANK C sequentially on the liquid crystal display 5 in step S3. When the name of a desired bank is displayed, the enter key 13 is depressed to select the bank (the response to a query in step S4 is affirmative). Then, the check issue date, payee, amount in words, amount in numbers and memo, for example, are displayed sequentially in that order on the liquid crystal display 5.

First, "Date: X=?, Y=?" is displayed on the liquid crystal display 5 in step S5.

Figure 7:
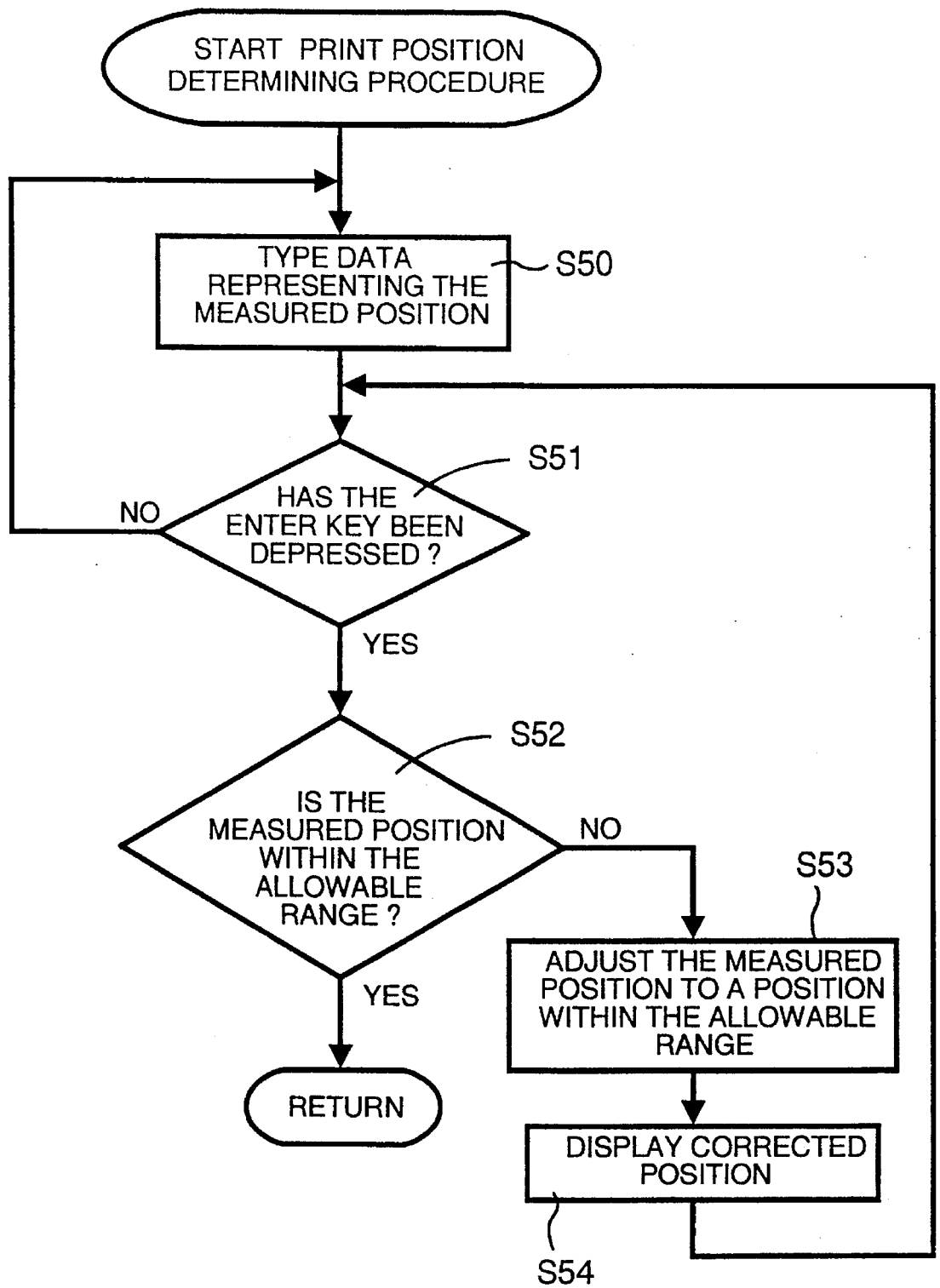
FIG. 7 is a flow chart of a print starting position deciding procedure to be carried out by the checkwriter of FIG. 1.

A print position determining procedure shown in the flow chart of FIG. 7 is executed in step S6. Suppose that the previously measured abscissa is, for example, 74 mm. Then, "74" is typed in step S50 and the enter key 13 is depressed. Then, "Date X=74, Y=?" is displayed on the liquid crystal display 5. Suppose that the previously measured ordinate is, for example, 10 mm. Then, "10" is typed, and the enter key 13 is depressed. "Date X=74, Y =10" is displayed on the liquid crystal display 5. In this state, the response to a query in step S51 is affirmative. Then, a query is made in step S52 to see if the measured print position is within an allowable print range. If the measured print position is not within the allowable print range, the response in step S52 is negative, and the measured print position is adjusted to a nearest print position in step S53. A correction is displayed on the liquid crystal display 5 in step S54. If the measured print position is within the allowable print range, the response in step S52 is affirmative, the print position determining procedure is ended, and control is returned to the main routine. Then, a print starting position registering procedure is started, and "Payee: X=?, Y=?" is displayed on the liquid crystal display 5 in step S7.

The control returns to the print starting position determining procedure in step S8 of the print starting position registering procedure of FIG. 7. When the previously measured abscissa is, for example, 25 mm, "25" is typed in step S50, and the enter key 13 is depressed. Then, "Payee: X=25, Y=?" is displayed on the liquid crystal display 5. When the previously measured ordinate is, for example, 30 mm, "30" is typed, and the enter key 13 is depressed. "Payee: X=25, Y=30" is displayed on the liquid crystal display 5. After the determination of the print positions has been completed (the response to a query in step S51 is affirmative), a query is made in step S52 to see if the determined position is within an allowable print range. If the determined print position is not within the allowable print range, i.e., the response in step S52 is negative, the determined print position is adjusted to a print position within the allowable print range and nearest to the measured print position in step S53, and a correction is displayed in step S54. If the determined print position is within the allowable print range, i.e., the response in step S52 is affirmative, the print position determining procedure is ended, and the control returns to the main routine.

Similarly, the print starting positions for amount in numbers, amount in words and memo are entered and registered through steps S9 to S14. Each of the thus registered print starting positions is represented by the abscissa of the head letter of the words, and the ordinate of the lower ends of the letters.

As mentioned above, characters and digits cannot be printed in regions outside a region on the check form 21 corresponding to the scaled region provided with the scale lines of the cover 3. If a measured abscissa and a measured ordinate in a region outside the scaled region provided with the scale lines 8 are entered, an abscissa and an ordinate within the scaled region nearest to the measured abscissa and the measured ordinate are registered as data representing the print starting position. In other words, the allowable abscissas of 20 to 130 and the allowable ordinates of 10 to 60 are stored beforehand in the ROM 104. If an abscissa of 140 and an ordinate of 30 are entered, an abscissa of 130 and an ordinate of 30 are stored in the RAM 106.

Because checks are issued to the same group of payees in most cases to pay, for example, water charges, gas charges, telephone charges and power charges respectively, those regular payees are registered in payee codes like the abbreviated numbers of telephone numbers. For example, a payee code "2" is assigned to a payee to whom electric charges are to be paid, and a payee code "4" is assigned to a VISA creditor, etc. The payee codes of the regular payees are registered on the template 7 (FIG. 1) stored in the bottom of the checkwriter 1. A list of the registered payee codes is stored in a storage device included in the checkwriter 1, such as ROM 104.

After the preparatory operation has been completed, the printing procedure shown in FIGS. 8A and 8B is executed. The cover 3 of the tray 2 is opened, check forms 21 are stacked in the tray 2, the cover 3 is closed, and the tray 2 is loaded into the checkwriter 1. Then, a query is made in step S21 to see if the tray 2 is loaded into the checkwriter 1. If the response in step S21 is affirmative, a check number is entered in step S22. If the top to the bottom check forms 21 are stacked in the tray 2 in ascending order of check numbers when printing a plurality of serial check numbers on the check forms 21, the check number of each check form 21 can be recognized automatically once the smallest check number is entered. The check number is used for retrieving or providing a list of the check issue date, the amount and the payee printed on the check form 21. When the check key 16 is depressed, i.e., the response to a query in step S23 is affirmative, "PAYMENT?, DEPOSIT?" is displayed on the liquid crystal display 5 in step S24. The cursor keys 14 and 15 are operated to select either "PAYMENT" or "DEPOSIT" in step S25, and the enter key 13 is depressed to enter the selected item. When the enter key 13 is depressed, the response to a query in step S26 is affirmative. Suppose that "PAYMENT" is selected. Then, "Check No. ?" is displayed on the liquid crystal display 5 in step S27 Then, a check number, for example, "482" is typed in step S28, and the enter key 13 is depressed to enter the check number. Then, the response to a query in step S29 is affirmative. The checkwriter 1 thus operates in an interactive mode.

"DATE?" is displayed on the liquid crystal display in step S30. A check issue data, for example, "1994/04/01" is typed in step S31, and the enter key 13 is depressed to register the check issue date. Then, the response to a query in step S32 is affirmative. When "PAY TO?" is displayed in step S33, the code of a desired payee, for example, "#4" is typed in step S34, and the enter key 13 is depressed to register the payee. Then, the response in step S35 is affirmative. The entry "#4" indicates that the payee is the VISA creditor represented by the registered payee code "4." The payee can also be specified by entering the payee's name by operating the keyboard 4. Then, "$?" is displayed in step S36. an amount of payment, for example, "199.96" is typed in step S37, and the enter key 13 is depressed to register the amount of payment. Then, the response to a query in step S38 is affirmative. "MEMO?" is displayed in step S39. The contents of the check memo are typed and registered by the same procedure in step S40. Then, the response to a query in step S41 is affirmative. Since the memo is for maker's reminder only, a memo need not necessarily be registered.

When the enter key 13 is depressed again, the response to a query in step S42 is affirmative, and "PRINT?, Y: YES, N: NO" is displayed in step S43. If "Y" is selected, the response to a query in step S44 is affirmative, and the printing operation is started in step S45. The foregoing procedure is repeated to print necessary words for the items on the plurality of check forms 21. If it is desired to collate the balance with the ledger when issuing a check, the arithmetic unit calculates an updated balance on the basis of the balance stored in the storage device, and the registered amount of payment and the updated balance, i.e., the balance after printing the amount on the check form 21, is displayed on the liquid crystal display 5 in step S47 when the collating key 12 is depressed, i.e., when the response in a query in step S46 is affirmative. The display of the updated balance facilitates management of the bank account.

The present invention is not limited in its practical application to the foregoing embodiment specifically described herein and may be embodied in various modes. For example, the checkwriter 1 may be constructed so as to execute balance collating software when specific keys, for example, a control key and a key "A," are depressed simultaneously without providing the keyboard 4 with the special collating key 12 for balance collation. Similarly, the checkwriter 1 may be constructed to execute software including procedures corresponding to those of the bank key, the check key and the location key when the alphanumeric keys of the keyboard assigned to those functions are operated.

What is claimed is:

1. A checkwriter for printing at predetermined positions on a check form, comprising:

a tray for containing check forms, said tray being detachably loaded into the checkwriter;

an input device enabling entering of desired words and data representing print starting positions where a printing operation for printing the desired words is to be started;

a memory communicating with the input device, said memory storing the desired words and the data representing print starting positions;

a display that displays contents of the memory; and a printing device that prints the desired words on the check form starting from the print starting positions, wherein the tray has a transparent cover having a scaled region provided with scale lines for measuring the print starting positions.

2. A checkwriter according to claim 1, further comprising a conveying device operatively engaging said check forms in said tray, said conveying device comprising:

a feed roller feeding said check forms from said tray, rollers conveying said check forms before and after printing with said printing device through said checkwriter, and guide frames disposed adjacent said feed roller and said rollers, said guide frames guiding said check forms.

3. A checkwriter according to claim 1, wherein said scaled region comprises a plurality of first scale lines aligned in a first direction and a plurality of second scale lines aligned in a second direction, substantially perpendicular to said first direction.

4. A checkwriter according to claim 3, wherein said first scale lines are spaced from each other by about 5 mm, and wherein said second scale lines are spaced from each other by about 5 mm.

5. A checkwriter according to claim 3, wherein first graduations 20 mm to 130 mm are marked on a line substantially parallel to said first direction, and wherein second graduations 10 mm to 60 mm are marked on a line substantially parallel to said second direction.

6. A checkwriter according to claim 1, further comprising a controller communicating with said input device, said memory, said display and said printing device, wherein if said data representing print starting positions is beyond an allowable print range, said controller adjusts said data representing print starting positions to a nearest print position.

7. A checkwriter according to claim 6, wherein said controller is structured to operate in an interactive mode.

8. A checkwriter according to claim 1, wherein said input device comprises designated function keys for performing predetermined functions, said predetermined functions including specifying a bank name, collating a ledger balance, entering selected matters, moving a cursor, entering said desired words, calling a registered payee, and registering a print starting position.

9. A checkwriter for printing at predetermined positions on a check form, comprising:

a check writing unit;

a tray for containing check forms, said tray being detachably loaded into the check writing unit;

input means for enabling entering of desired words and data representing print starting positions where a printing operation for printing the desired words is to be started;

storage means for storing the desired words and the data representing print starting positions;

display means for displaying contents of the storage means; and printing means for printing the desired words on the check form starting from the print starting positions, wherein the tray has a transparent cover having a scaled region provided with scale lines for measuring the print starting positions.

10. A checkwriter according to claim 9, further comprising conveying means for conveying said check forms to and from said printing means.

11. A checkwriter according to claim 9, wherein said scaled region comprises a plurality of first scale lines aligned in a first direction and a plurality of second scale lines aligned in a second direction, substantially perpendicular to said first direction.

12. A checkwriter according to claim 11, wherein said first scale lines are spaced from each other by about 5 mm, and wherein said second scale lines are spaced from each other by about 5 mm.

13. A checkwriter according to claim 11, wherein first graduations 20 mm to 130 mm are marked on a line substantially parallel to said first direction, and wherein second graduations 10 mm to 60 mm are marked on a line substantially parallel to said second direction.

14. A checkwriter according to claim 9, further comprising controller means for controlling operation of said checkwriter, wherein if said data representing print starting positions is beyond an allowable print range, said controller means adjusts said data representing print starting positions to a nearest print position.

15. A checkwriter according to claim 14, wherein said controller means is structured to operate in an interactive mode.

16. A checkwriter according to claim 9, wherein said input means comprises designated function keys for performing predetermined functions, said predetermined functions including specifying a bank name, collating a ledger balance, entering selected matters, moving a cursor, entering said desired words, calling a registered payee, and registering a print starting position.

17. A method of operating a checkwriter for printing at predetermined positions on a check form, the checkwriter including a check writing unit and a tray for containing check forms, said tray being detachably loaded into the check writing unit and having a transparent cover, the method comprising:

measuring print starting positions using scale lines of a scale region in said transparent tray cover;

enabling entering of desired words and data representing said print starting positions;

storing the desired words and the data representing said print starting positions;

displaying contents of the stored desired words and data representing said print starting positions; and printing the desired words on the check form starting from said print starting positions.

18. A method according to claim 17, wherein if said data representing print starting positions is beyond an allowable print range, the method comprising adjusting said data representing print starting positions to a nearest print position.

19. A method according to claim 18, further comprising storing the adjusted data as corrected data.

20. A method according to claim 17, further comprising designating function keys for performing predetermined functions, said predetermined functions including specifying a bank name, collating a ledger balance, entering selected matters, moving a cursor, entering said desired words, calling a registered payee, and registering a print starting position.

* * * * *